US011919983B2

(12) United States Patent
Okada et al.

(10) Patent No.: US 11,919,983 B2
(45) Date of Patent: Mar. 5, 2024

(54) VINYLIDENE FLUORIDE COPOLYMER PARTICLES AND USE THEREOF

(71) Applicant: Kureha Corporation, Tokyo (JP)

(72) Inventors: Kayoko Okada, Tokyo (JP); Yoshiyuki Nagasawa, Tokyo (JP); Aya Oikawa, Tokyo (JP); Yumeno Suzuki, Tokyo (JP); Shota Kobayashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 1192 days.

(21) Appl. No.: 16/485,585

(22) PCT Filed: Jan. 18, 2018

(86) PCT No.: PCT/JP2018/001309
§ 371 (c)(1),
(2) Date: Aug. 13, 2019

(87) PCT Pub. No.: WO2018/179696
PCT Pub. Date: Oct. 4, 2018

(65) Prior Publication Data
US 2021/0179756 A1 Jun. 17, 2021

(30) Foreign Application Priority Data
Mar. 31, 2017 (JP) ................. 2017-072858

(51) Int. Cl.
C08F 214/22 (2006.01)
C08F 14/22 (2006.01)
C09D 127/16 (2006.01)
H01M 50/426 (2021.01)
H01M 50/46 (2021.01)
C08K 3/04 (2006.01)
C08K 3/22 (2006.01)

(52) U.S. Cl.
CPC ........ C08F 214/225 (2013.01); C09D 127/16 (2013.01); H01M 50/426 (2021.01); H01M 50/461 (2021.01); C08K 3/04 (2013.01); C08K 3/22 (2013.01); C08K 2003/2203 (2013.01); C08K 2003/2262 (2013.01); C08K 2003/2289 (2013.01); C08K 2003/2293 (2013.01)

(58) Field of Classification Search
CPC .... C08F 214/225; C08F 14/22; C08F 214/22; C09D 127/16; H01M 50/426; H01M 50/461
See application file for complete search history.

(56) References Cited
U.S. PATENT DOCUMENTS

| | | |
|---|---|---|
| 3,178,399 A | 4/1965 | Lo |
| 5,349,003 A | 9/1994 | Kato et al. |
| 5,646,201 A | 7/1997 | Araki et al. |
| 5,900,183 A | 5/1999 | Kronfli et al. |
| 6,037,080 A | 3/2000 | Kronfli et al. |
| 7,803,867 B2 | 9/2010 | Hanrahan et al. |
| 2009/0239147 A1 | 9/2009 | Tou et al. |
| 2010/0173196 A1 | 7/2010 | Itou et al. |
| 2013/0273424 A1 | 10/2013 | Watanabe et al. |
| 2015/0147462 A1 | 5/2015 | Inaba et al. |
| 2015/0179996 A1 | 6/2015 | Inaba et al. |
| 2015/0263325 A1 | 9/2015 | Honda et al. |
| 2016/0202639 A1 | 7/2016 | Matsushita et al. |
| 2017/0015772 A1 | 1/2017 | Watanabe et al. |
| 2018/0248193 A1 | 8/2018 | Sakai et al. |

FOREIGN PATENT DOCUMENTS

| | | |
|---|---|---|
| CN | 101379131 A | 3/2009 |
| CN | 103261247 A | 8/2013 |
| CN | 104272502 A | 1/2015 |
| EP | 0 793 286 A1 | 9/1997 |
| EP | 2 533 335 A1 | 12/2012 |
| EP | 2 565 969 A1 | 3/2013 |
| EP | 2 660 254 A1 | 11/2013 |
| EP | 2 724 394 B1 | 8/2015 |
| EP | 3 118 230 A1 | 1/2017 |
| JP | H09213370 A | 8/1997 |
| JP | 2012219125 A | 11/2012 |
| KR | 10-1998-023932 A | 7/1998 |
| KR | 10-2013-0109186 A | 10/2013 |
| KR | 10-2014-0017525 A | 2/2014 |
| KR | 10-2014-0133587 A | 11/2014 |
| KR | 10-2015-0004371 A | 1/2015 |
| WO | WO 99/03900 A1 | 1/1999 |
| WO | WO2007088979 A1 | 8/2007 |
| WO | WO2012090876 A1 | 7/2012 |

(Continued)

OTHER PUBLICATIONS

Office Action dated Mar. 16, 2021, in Japanese Patent Application No. 2017-072858.
Office Action dated Dec. 22, 2020, in Chinese Patent Application No. 201880005834.8.
Extended European Search Report dated Mar. 9, 2020, in European Patent Application No. 18776446.9.
Office Action dated Jul. 13, 2021, in Japanese Patent Application No. 2017-072858.
English translation of International Preliminary Report on Patentability and Written Opinion dated Oct. 10, 2019, in PCT/JP2018/001309 (Forms PCT/IB/338, PCT/IB/373, and PCT/ISA/237).

(Continued)

Primary Examiner — Catherine S Branch
(74) Attorney, Agent, or Firm — Birch, Stewart, Kolasch & Birch, LLP

(57) ABSTRACT

Provided is a vinylidene fluoride copolymer particle which is capable of efficiently exhibiting high adhesion between an electrode and a separator. The vinylidene fluoride copolymer particle of the present invention comprises vinylidene fluoride; and
a compound having an oxygen atom-containing functional group; wherein a ratio of oxygen atom in a surface of the vinylidene fluoride copolymer particle is higher than a ratio of oxygen atom in the vinylidene fluoride copolymer particle other than the surface thereof.

14 Claims, No Drawings

(56) References Cited

FOREIGN PATENT DOCUMENTS

| WO | WO 2012/117910 A1 | 9/2012 |
| WO | WO2014002936 A1 | 1/2014 |
| WO | WO2014002937 A1 | 1/2014 |
| WO | WO2015137137 A1 | 9/2015 |
| WO | WO2016167294 A1 | 10/2016 |
| WO | WO 2018/011244 A1 | 1/2018 |

OTHER PUBLICATIONS

International Search Report of the International Searching Authority for PCT/JP2018/001309 dated Apr. 24, 2018.
Translation of the International Search Report of the International Searching Authority for PCT/JP2018/001309 dated Apr. 24, 2018.
European Office Action, dated Sep. 4, 2020, for European Application No. 18776440.9.
Cheng et al., "Formation of particulate microporous poly(vinylidene fluoride) membranes by isothermal immersion precipitation from the 1-octanol/dimethylformamide/poly(vinylidene fluoride) system" Polymer, vol. 40, 1999, pp. 2395-2403.
European Communication of a notice of opposition for EP 3604363 B1 (European Application No. 18776446.9), dated Jan. 12, 2023, with an English translation.
Priority document of Patent Application No. 16179636.2, dated Jul. 15, 2016.
Office Action dated Jun. 17, 2021, in Chinese Patent Application No. 201880005834.8.
Summons to Attend Oral Hearing Pursuant to Rule 115(1) EPC dated Apr. 9, 2021, in European Patent Application No. 18 776 446.9.
Office Action dated Nov. 11, 2021, in Chinese Patent Application No. 201880005834.8.
Korean Office Action, dated Jul. 27, 2020, for Korean Application No. 10-2019-7020302, with an English translation.
European Summons to Attend Oral Proceedings Pursuant to Rule 115(1) EPC for corresponding European Application No. 18776446.9, dated Sep. 13, 2023.

VINYLIDENE FLUORIDE COPOLYMER PARTICLES AND USE THEREOF

TECHNICAL FIELD

The present invention relates to a vinylidene fluoride copolymer particle and use thereof. More particularly, the present invention relates to a vinylidene fluoride copolymer particle and a dispersion, a coating composition, a separator, a binder composition, and a secondary battery using the same.

BACKGROUND ART

In recent years, there have been remarkable developments in electronic technology, and the functionality of miniature mobile devices has become increasingly advanced. Therefore, there is a demand for the power supplies used in these devices to be smaller and lighter (i.e., higher energy density). Non-aqueous electrolyte secondary batteries such as lithium-ion secondary batteries are widely used as batteries having high energy density.

From the perspective of global environmental problems or energy conservation, such non-aqueous electrolyte secondary batteries are also used in hybrid automobiles combining a secondary battery and an engine and used in electric automobiles having a secondary battery as a power supply. The applications thereof are expanding.

In general, a separator is provided between electrodes (a positive electrode and a negative electrode) of the non-aqueous electrolyte secondary battery. In non-aqueous electrolyte secondary batteries, it is known that the occurrence of a gap between the electrode and the separator results in problems such as reductions of battery characteristics and battery life. Therefore, there is a demand to improve the adhesion of the bonded part between the electrode and the separator.

As a result, a vinylidene fluoride copolymer composition having improved adhesion between the electrode and the separator has been developed. For example, Patent Document 1 describes a vinylidene fluoride copolymer composition having improved adhesion to the electrode by containing a constituent unit derived from an oxygen atom-containing functional group such as acrylpropyl succinate (APS) and monomethyl maleate (MMM).

CITATION LIST

Patent Document

Patent Document 1: WO 2012/090876 (published on Jul. 5, 2012)

SUMMARY OF INVENTION

Technical Problem

However, in the vinylidene fluoride-based copolymer composition described in Patent Document 1, even if the composition contains the same content of the constituent unit derived from the compound described above, there may be a difference in the adhesion between the electrode and the separator.

The present invention was accomplished in light of the above issues. The object of the present invention is to provide a vinylidene fluoride copolymer particle which is capable of efficiently exhibiting high adhesion between an electrode and a separator even if the particle contains the same amount of the compound having the oxygen atom-containing functional group.

Solution to Problem

The vinylidene fluoride copolymer particle according to the present invention comprises a constituent unit derived from vinylidene fluoride; and a constituent unit derived from a compound having an oxygen atom-containing functional group; wherein a ratio of oxygen atom in a surface of the vinylidene fluoride copolymer particle is higher than a ratio of oxygen atom in the vinylidene fluoride copolymer particle other than the surface thereof.

The vinylidene fluoride copolymer particle according to the present invention can be used, for example, in coating compositions, separators, binder compositions, and secondary batteries. The vinylidene fluoride copolymer particle according to the present invention used in these applications may be a form in which the shape of the particles is maintained and can be used, for example, in the form of a dispersion.

Advantageous Effects of Invention

According to the present invention, a vinylidene fluoride copolymer particle which is capable of efficiently improving adhesion between an electrode and a separator can be provided.

DESCRIPTION OF EMBODIMENTS

The vinylidene fluoride copolymer particle according to the present embodiment comprises a constituent unit derived from vinylidene fluoride; and a constituent unit derived from a compound having an oxygen atom-containing functional group; wherein a ratio of oxygen atom in a surface of the vinylidene fluoride copolymer particle is higher than a ratio of oxygen atom in the vinylidene fluoride copolymer particle other than the surface thereof. The vinylidene fluoride polymer particle according to the present embodiment will be described in detail below.

Vinylidene Fluoride Copolymer Particle

The vinylidene fluoride copolymer particle according to the present embodiment (hereinafter, also simply referred to as "vinylidene fluoride copolymer particle") is a copolymer particle containing a constituent unit derived from vinylidene fluoride as a main constituent unit. Note that in the present specification, the "main constituent unit" refers to a constituent unit that occupies the largest proportion (mol %) of the constituent units constituting the polymer.

More specifically, the vinylidene fluoride copolymer particles are particles formed from a copolymer of vinylidene fluoride and a compound having an oxygen atom-containing functional group (hereinafter, also referred to as "oxygen atom-containing compound").

In the oxygen atom-containing compound according to the present embodiment, the oxygen atom-containing functional group is preferably a carboxyl group or a carboxylate. Examples of the oxygen atom-containing compound include one or two types selected from the group consisting of an unsaturated dibasic acid, an unsaturated dibasic acid monoester, a compound represented by the following formula (2), a compound represented by the following formula (3), and a compound represented by the following formula (4).

[Chemical Formula 1]

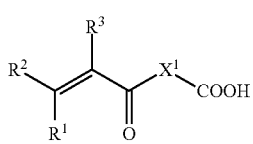

(2)

[Chemical Formula 2]

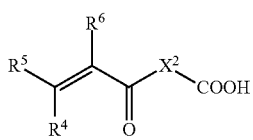

(3)

[Chemical Formula 3]

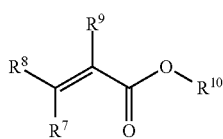

(4)

In the vinylidene fluoride copolymer particle according to the present embodiment, the compound represented by the above formula (2) is preferably a compound represented by the following formula (5). These compounds are described in detail below in order.

Examples of the unsaturated dibasic acid according to the present embodiment include fumaric acid, maleic acid, citraconic acid, and phthalic acid. By including at least one unsaturated dibasic acid selected from these substances, adhesion between the electrode and a fluororesin layer and adhesion between the separator and the fluororesin layer are further improved.

Examples of the unsaturated dibasic acid monoester according to the present embodiment include monomethyl fumarate, monoethyl fumarate, monomethyl maleate, monoethyl maleate, monomethyl citraconate, monoethyl citraconate, monomethyl phthalate, and monoethyl phthalate. By including at least one unsaturated dibasic acid monoester selected from these substances, adhesion between the electrode and the fluororesin layer and adhesion between the separator and the fluororesin layer are further improved.

In the compound represented by the above formula (2) according to the present embodiment, in the above formula (2), $R^1$, $R^2$, and $R^3$ are each independently a hydrogen atom, a chlorine atom, or an alkyl group having from 1 to 5 carbon atoms.

Examples of the alkyl group having from 1 to 5 carbon atoms include a methyl group, an ethyl group, a propyl group, and an isopropyl group. In the present embodiment, $R^1$ is preferably a hydrogen atom or a methyl group and more preferably a hydrogen atom. Additionally, $R^2$ is preferably a hydrogen atom or a methyl group and more preferably a hydrogen atom. Additionally, $R^3$ is preferably a hydrogen atom or a methyl group and more preferably a hydrogen atom.

In the above formula (2), the main chain constituting $X^1$ preferably has 1 to 19 atoms, preferably 1 to 14 atoms, and more preferably 1 to 9 atoms.

Examples of the atom constituting such a main chain include a carbon atom and a heteroatom. Note that the number of the hydrogen atom is not included in the number of atoms in the main chain in the specification. Note that the number of atoms in the main chain means the number of atoms of a backbone moiety in a chain in which a carboxyl group described on the right of $X^1$ and a group described on the left of $X^1$ ($R^1R^2C=CR^3$—CO—) are connected via a minimum number of atoms.

In the above formula (2), the molecular weight of the atomic group $X^1$ is 472 or less and preferably 172 or less. Although the lower limit of the molecular weight of the atomic group is not particularly limited, it is normally about 15.

In the above formula (2), $X^1$ contains at least one heteroatom selected from an oxygen atom and a nitrogen atom. Furthermore, the atomic group described above contains at least one heteroatom or may contain a plurality of heteroatoms. From the perspective of copolymerizability with vinylidene fluoride, the heteroatom is preferably an oxygen atom. Note that the heteroatom may be included both in the main chain and the side chain of the atomic group or may be included only in either chain. Further, the side chain of the atomic group may also contain one or more carboxyl groups.

More particularly, the compound represented by the above formula (2) according to the present embodiment is preferably a compound represented by the following formula (5).

[Chemical Formula 4]

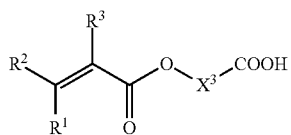

(5)

In the compound represented by the above formula (5) according to the present embodiment, $R^1$, $R^2$, and $R^3$ in the above formula (5) are each the same as $R^1$, $R^2$, and $R^3$ in the above formula (2), and $X^3$ is an atomic group having a main chain constituted of 1 to 18 atoms and having a molecular weight of 456 or less.

In the compound represented by the above formula (5), the main chain constituting $X^3$ has 1 to 18 atoms, preferably 1 to 13 atoms, and more preferably 1 to 8 atoms. Examples of the atom constituting the main chain include a carbon atom and a heteroatom. Note that the number of the hydrogen atom is not included in the number of atoms in the main chain. Note that the number of atoms in the main chain means, in the formula (5), the number of atoms of a backbone moiety in a chain in which a carboxyl group described on the right of $X^3$ and a group described on the left of $X^3$ ($R^1R^2C=CR^3$—CO—O—) are connected via a minimum number of atoms.

In the present embodiment, the molecular weight of the atomic group $X^3$ in the compound represented by the above formula (5) is 456 or less and preferably 156 or less. Although the lower limit of the molecular weight of the atomic group is not particularly limited, it is normally about 15.

In the above formula (5), $X^3$ may contain at least one heteroatom selected from an oxygen atom and a nitrogen atom or may contain a plurality of heteroatoms. Note that the heteroatom may be included both in the main chain and the side chain of the atomic group or may be included only in either chain.

Specific examples of the compound represented by the above formula (2) include acryloyloxypropyl succinate, acryloyloxyethyl succinate, methacryloyloxyethyl succinate, methacryloyloxypropyl succinate, 2-carboxyethyl acrylate, 2-carboxyethyl methacrylate, acryloyloxyethyl phthalate, methacryloyloxyethyl phthalate, N-carboxyethyl (meth)acrylamide, and carboxyethyl thio(meth)acrylate. From the perspective of the adhesion between the electrode and the fluororesin layer and the adhesion between the separator and the fluororesin layer as described below, the compound represented by the above formula (2) is preferably acryloyloxypropyl succinate and/or acryloyloxyethyl succinate.

In the compound represented by the above formula (3) according to the present embodiment, in the above formula (3), $R^4$, $R^5$, and $R^6$ are each independently a hydrogen atom, a chlorine atom, or an alkyl group having from 1 to 5 carbon atoms. Examples of the alkyl group having from 1 to 5 carbon atoms include a methyl group, an ethyl group, a propyl group, and an isopropyl group. In the present embodiment, $R^4$ is preferably a hydrogen atom or a methyl group and more preferably a hydrogen atom. Additionally, $R^5$ is preferably a hydrogen atom or a methyl group and more preferably a hydrogen atom. Additionally, $R^6$ is preferably a hydrogen atom or a methyl group and more preferably a hydrogen atom.

In the above formula (3), the main chain constituting $X^2$ has 1 to 19 atoms, preferably 1 to 14 atoms, and more preferably 1 to 9 atoms. Examples of the atom constituting the main chain include a carbon atom and a heteroatom. Note that the number of the hydrogen atom is not included in the number of atoms in the main chain. Note that the number of atoms in the main chain means, in the above formula (3), the number of atoms of a backbone moiety in a chain in which a carboxyl group described on the right of $X^2$ and a group described on the left of $X^2$ ($R^4R^5C=CR^6$—O—) are connected via a minimum number of atoms.

In the above formula (3), the molecular weight of the atomic group $X^2$ is 484 or less and preferably 184 or less. Although the lower limit of the molecular weight of the atomic group is not particularly limited, it is normally about 15.

In the above formula (3), $X^2$ contains at least one heteroatom selected from an oxygen atom and a nitrogen atom. Furthermore, the atomic group described above contains at least one heteroatom or may contain a plurality of heteroatoms. From the perspective of copolymerizability with vinylidene fluoride, the heteroatom is preferably an oxygen atom. Note that the heteroatom may be included both in the main chain and the side chain of the atomic group or may be included only in either chain. The side chain of the atomic group may also contain one or more carboxyl groups.

Example of the compound represented by the above formula (3) according to the present embodiment includes vinyl carboxyalkyl ethers. Specific examples include vinyl carboxymethyl ether and vinyl carboxyethyl ether.

In the compound represented by the above formula (4) according to the present embodiment, in the above formula (4), $R^7$, $R^8$, and $R^9$ are each independently a hydrogen atom, a chlorine atom, or an alkyl group having from 1 to 5 carbon atoms. Examples of the alkyl group having from 1 to 5 carbon atoms include a methyl group, an ethyl group, a propyl group, and an isopropyl group. In the present embodiment, $R^7$, $R^8$, and $R^9$ are each preferably a hydrogen atom.

In the above formula (4), $R^{10}$ is a hydrogen atom, or a hydrocarbon moiety having from 1 to 5 carbon atoms and containing at least one hydroxyl group. Examples of the hydrocarbon moiety having from 1 to 5 carbon atoms and containing at least one hydroxyl group include a hydroxyethyl group and a hydroxypropyl group.

Specific example of the compound represented by the above formula (4) include acrylic acid, methacrylic acid, 2-hydroxyethyl acrylate, 2-hydroxypropyl acrylate, 2-hydroxyethylmethyl acrylate, and 2-hydroxypropyl methacrylate. From the perspective of the adhesion between the electrode and the fluororesin layer as described below, the compound represented by the above formula (4) is preferably acrylic acid.

Furthermore, the vinylidene fluoride copolymer particles according to the present embodiment may further contain a constituent unit derived from a compound other than the above-described oxygen atom-containing compounds. Examples of such compound include a halogenated alkyl vinyl compound, a hydrocarbon monomer, a (poly)alkylene glycol dimethacrylate, a (poly)alkylene glycol diacrylate, and a polyvinylbenzene.

Example of the halogenated alkyl vinyl compound includes fluorinated alkyl vinyl compounds. Specific examples include hexafluoropropylene (HFP), chlorotrifluoroethylene (CTFE), trifluoroethylene (TFE), tetrafluoroethylene, hexafluoroethylene, and fluoroalkyl vinyl ethers. Among them, hexafluoropropylene and chlorotrifluoroethylene are preferred.

In this embodiment, the ratio of oxygen atom in the surface of the vinylidene fluoride copolymer particle is higher than the ratio of oxygen atom in the vinylidene fluoride copolymer particle other than the surface thereof. This means that the oxygen atom-containing functional group contributing to the adhesion is more presented on the surface of the vinylidene fluoride copolymer particle than the inside thereof. That is, the vinylidene fluoride copolymer particle according to the present embodiment contains more oxygen atoms exposed on the surface of the vinylidene fluoride copolymer particle than other vinylidene fluoride copolymer particles containing the same amount of the oxygen atom-containing compound contributing to the adhesion. In other words, in the vinylidene fluoride copolymer particle according to the present embodiment, the oxygen atoms tend to be present on the surface. The resulting effect will be described in detail below.

As used herein, the "surface of the vinylidene fluoride copolymer particle" refers to a region including the outermost surface of the vinylidene fluoride copolymer particle and the area having the depth of 0 to 10 nm from this outermost surface. Furthermore, the "other than the surface of the vinylidene fluoride copolymer particle" means the region of vinylidene fluoride copolymer particle excluding the above-described region.

In the vinylidene fluoride copolymer particle according to the present embodiment, the ratio of oxygen atom is preferably 9 at % or more in all elements presented in the surface of the vinylidene fluoride copolymer. The ratio of oxygen atom in the surface of the vinylidene fluoride copolymer particle is determined by XPS (X-ray photoelectron spectroscopy) measurement.

Here, XPS is an analytical technique capable of analyzing the state of chemical bonds and the elemental composition on the surface of the sample by detecting and analyzing the element-inherent kinetic energy of photoelectrons generated by irradiating the surface of the sample with X-rays. The XPS is employed for elemental composition analysis of the surface of the vinylidene fluoride copolymer particle according to the present embodiment. In XPS, the elemental composition of the surface of the sample can be calculated by dividing the peak area of each element by the sensitivity factor of each element. Note that, in the present specification, specific examples of the "element presented in the surface of the vinylidene fluoride copolymer particle", which is detected by XPS for calculating the ratio of oxygen atom, include a carbon (C) atom, a fluorine (F) atom, or an oxygen (O) atom. Even if other elements are presented, the surface can be considered to present C, F, and O only.

Although the average particle size of the vinylidene fluoride copolymer particle according to the present embodiment is not particularly limited, it may be 10 nm or more and 1 µm or less, for example. The method for measuring the average particle size of the vinylidene fluoride copolymer particle according to the present embodiment will be described in the examples described below.

Production Method of Vinylidene Fluoride Copolymer Particle

The vinylidene fluoride copolymer particles according to the present embodiment can be obtained by granulation with a known method.

In the production method of the vinylidene fluoride copolymer according to the present embodiment (hereinafter, also referred to as "production method"), the above-described oxygen atom-containing compound is added immediately before the polymerization of the vinylidene fluoride polymer is completed. With this method, the oxygen atom tends to be present on the surface of the obtained vinylidene fluoride copolymer particle.

In the production method, in order to obtain the vinylidene fluoride copolymer, vinylidene fluoride and the oxygen atom-containing compound and, if needed, another compound such as the fluorinated alkyl vinyl compound are copolymerized. Here, the charged amount of vinylidene fluoride is preferably 50 parts by mass or more, more preferably 60 parts by mass or more, and even more preferably 70 parts by mass or more when the total amount of monomers charged in the polymerization is 100 parts by mass.

Further, the charged amount of the oxygen atom-containing compound is preferably 0.01 parts by mass or more and 10 parts by mass or less, more preferably 0.02 parts by mass or more and 9 parts by mass or less, and even more preferably 0.03 parts by mass or more and 8 parts by mass or less when the total amount of monomers charged in the polymerization is 100 parts by mass.

Further, the charged amount of another compound is preferably 1 part by mass or more and 50 parts by mass or less, more preferably 2 parts by mass or more and 40 parts by mass or less, and even more preferably 3 parts by mass or more and 30 parts by mass or less when the total amount of monomers charged in the polymerization is 100 parts by mass.

The method for polymerizing the vinylidene fluoride copolymer in the production method is not particularly limited. Examples of the method include known polymerization methods. Examples of the polymerization method include suspension polymerization, emulsion polymerization, soap-free emulsion polymerization, mini-emulsion polymerization, seed emulsion polymerization, and solution polymerization. Particularly preferred examples include emulsion polymerization, soap-free emulsion polymerization, mini-emulsion polymerization, and seed emulsion polymerization.

Emulsion polymerization is a type of radical polymerization. It is a polymerization method performed by mixing a medium such as water, a sparingly soluble monomer in the medium, and an emulsifier (hereinafter, also referred to as "surfactant") and adding a polymerization initiator soluble in the medium. In emulsion polymerization, a dispersion medium, a surfactant, and a polymerization initiator are used in addition to vinylidene fluoride and another compound.

Suspension polymerization is a polymerization method performed by dissolving an oil-soluble polymerization initiator in a water-insoluble monomer in water containing a reagent such as a suspending agent, followed by suspension and dispersion by mechanical agitation. In suspension polymerization, the polymerization is conducted in monomer droplets to obtain a vinylidene fluoride copolymer microparticle.

Soap-free emulsion polymerization is an emulsion polymerization performed without using an ordinary emulsifier that is used in the above-described emulsion polymerization. The vinylidene fluoride copolymer obtained by soap-free emulsion polymerization is preferred because the emulsifier was not remained in the copolymer particle.

Mini-emulsion polymerization is performed by refining monomer droplets into sub-micron size by applying a strong shearing force using an apparatus such as an ultrasonic generator. In mini-emulsion polymerization, in order to stabilize the refined monomer droplets, a sparingly water-soluble material, hydrophobe, is added. In ideal mini-emulsion polymerization, microparticles of the vinylidene fluoride polymer are obtained by polymerizing monomer droplets.

Seed emulsion polymerization is a polymerization performed by coating the particle obtained by the above-described polymerization method with a polymer formed from other monomers. In a dispersion of the microparticle, vinylidene fluoride and other monomers, a dispersion medium, a surfactant, and a polymerization initiator are further used.

The dispersion medium is not particularly limited, and a known dispersion medium can be used. Preferably, water is used as the dispersion medium.

The surfactant may be a non-ionic surfactant, a cationic surfactant, an anionic surfactant, or an amphoteric surfactant, or a plurality of types may be used in combination. Suitable surfactants include perfluorinated surfactants, partially fluorinated surfactants, and non-fluorinated surfactants, which are used in the polymerization of polyvinylidene fluoride in the related art. Among them, a perfluoroalkylsulfonic acid and a salt thereof, a perfluoroalkylcarboxylic acid and a salt thereof, and a fluorine-based surfactant having a fluorocarbon chain or fluoropolyether chain are preferred. A perfluoroalkylcarboxylic acid and a salt thereof are more preferred. In the present embodiment, the emulsifier may be used alone or as a combination of two or more types.

The added amount of the emulsifier is preferably from 0.005 to 22 parts by mass when the total amount of monomers used in the polymerization is 100 parts by mass.

The polymerization initiator is not particularly limited, and a known polymerization initiator can be used. As the polymerization initiator, a water-soluble peroxide, a water-soluble azo compound, or a redox initiator system is used. Examples of the water-soluble peroxide include ammonium persulfate and potassium persulfate. Examples of the water-soluble azo compound include AIBN and AMBN. Example of the redox initiator system includes ascorbic acid-hydrogen peroxide. The polymerization initiator is preferably the water-soluble peroxide. The polymerization initiator may be used alone or as a combination of two or more types.

The added amount of the polymerization initiator is preferably from 0.01 to 5 parts by mass when the total amount of monomers used in the polymerization is 100 parts by mass.

In the present production method, a chain transfer agent may be used to adjust the degree of polymerization of the obtained vinylidene fluoride copolymer particle. Examples of the chain transfer agent may include ethyl acetate, methyl acetate, diethyl carbonate, acetone, ethanol, n-propanol, acetaldehyde, propyl aldehyde, ethyl propionate, and carbon tetrachloride.

Additionally, if needed, a pH adjusting agent may be used. Examples of the pH adjusting agent include an electrolyte substrate having a buffer capacity such as sodium dihydrogen phosphate, disodium hydrogen phosphate, and potassium dihydrogen phosphate; and a basic substrate such as sodium hydroxide, potassium hydroxide, barium hydroxide, calcium hydroxide, and ammonia.

Additionally, other optional components such as an anti-settling agent, a dispersion stabilizer, a corrosion inhibitor, an anti-fungal agent, and a wetting agent may be used, if needed.

The added amount of the other optional component is preferably from 0.01 to 10 parts by mass and more preferably from 0.02 to 7 parts by mass when the total amount of monomers used in the polymerization is 100 parts by mass.

Polymerization Condition

In the polymerization of the vinylidene fluoride copolymer according to the present production method, the polymerization temperature may be selected appropriately depending on a factor such as the type of polymerization initiator. For example, the temperature may be set to 0 to 120° C., preferably 20 to 110° C., and more preferably 40 to 100° C.

For example, the polymerization pressure is from 0 to 10 MPa, preferably from 0.5 to 8 MPa, and more preferably from 1 to 6 MPa.

Although the polymerization time is not particularly limited, the polymerization time is preferably from 1 to 24 hours considering the productivity.

In addition, the vinylidene fluoride copolymer particle thus obtained may be used as a dispersion or may be used by pulverizing the particles with at least one method selected from salt precipitation, freeze milling, spray drying, and freeze drying; and then physically or chemically re-dispersing the vinylidene fluoride copolymer particles in a dispersion medium such as water. In addition, a surfactant, a pH adjusting agent, an anti-settling agent, a dispersion stabilizer, a corrosion inhibitor, an anti-fungal agent, and a wetting agent may be further included in the dispersion containing the untreated vinylidene fluoride copolymer particle, or impurities may be removed by dialysis membrane or ion exchange resin.

The vinylidene fluoride copolymer particle obtained as described above may be used alone or in combination with other substances. Examples of use of the vinylidene fluoride copolymer according to the present embodiment will be described below.

The vinylidene fluoride copolymer particle according to the present embodiment can be used in the form of a dispersion, for example. Such a dispersion contains the vinylidene fluoride copolymer particle according to the present embodiment and the dispersion medium.

In the present embodiment, the content of the vinylidene fluoride copolymer particle in the dispersion is preferably 60 parts by mass or less when the total amount of the dispersion is 100 parts by mass.

For example, the solvent of the dispersion according to the present embodiment is preferably water. However, the solvent is not particularly limited as long as it is a mixture of water and an optional non-aqueous solvent which is miscible with water and as long as it cannot dissolve the vinylidene fluoride resin but can disperse, suspend, or emulsify the resin. Examples of the non-aqueous solvent include amide compounds such as N-methylpyrrolidone, dimethylformamide, and N,N-dimethylacetamide; hydrocarbons such as toluene, xylene, n-dodecane, and tetralin; alcohols such as methanol, ethanol, isopropyl alcohol, 2-ethyl-1-hexanol, 1-nonanol, and lauryl alcohol; ketones such as acetone, methyl ethyl ketone, cyclohexanone, phorone, acetophenone, and isophorone; esters such as benzyl acetate, isopentyl butyrate, methyl lactate, ethyl lactate, and butyl lactate; amine compounds such as o-toluidine, m-toluidine, and p-toluidine; lactones such as γ-butyrolactone and δ-butyrolactone; sulfoxide or sulfone compounds such as dimethyl sulfoxide, and sulfolane. The non-aqueous solvent is used by mixing it with water at any ratio. Water may be used alone or may be a mixed dispersion medium obtained by mixing water with one type or two or more types of non-aqueous solvents.

Additionally, a pH adjusting agent, an anti-settling agent, a dispersion stabilizer, a corrosion inhibitor, an anti-fungal agent, and a wetting agent may be used, if needed.

Coating Composition

The vinylidene fluoride copolymer particle according to the present embodiment can also be used in a coating composition.

The coating composition according to the present embodiment is a composition used for forming the fluororesin layer for improving the adhesion between the electrode and the separator in a secondary battery comprising a negative electrode layer, a positive electrode layer (electrodes), and a separator disposed between electrodes. The coating composition according to the present embodiment includes at least vinylidene fluoride copolymer particle according to the present embodiment. Therefore, as an example of the present embodiment, the coating composition may be a coating composition for forming the fluororesin layer provided on at least one surface of the separator provided between the negative electrode layer and the positive electrode layer in a secondary battery, the coating composition including the above-described dispersion. As another example, the coating composition may be a coating composition for forming a fluororesin layer provided on at least one surface of a negative electrode layer and a positive electrode layer so as to contact with a separator provided between the negative electrode layer and the positive electrode layer in a secondary battery, the coating composition including the vinylidene fluoride copolymer particle according to the present embodiment. Using the coating composition according to the present embodiment, the adhesion between the electrode and the separator can be efficiently improved.

In the coating composition, the vinylidene fluoride copolymer particle obtained by the polymerization may be used as is in combination with the dispersion or may be used after pulverized with at least one method selected from salt precipitation, freeze milling, spray drying, and freeze drying and mixed with the dispersion. When the dispersion containing the vinylidene fluoride copolymer particle is used as the coating composition, the coating composition may remain dispersed in the dispersion medium or may be physically or chemically redispersed in the dispersion medium such as water prepared separately. Also, when used after pulverization, it may be physically or chemically re-dispersed in the dispersion medium such as water for use. The dispersion medium is preferably water. However, the dispersion medium is not particularly limited as long as it is a mixture of water and an optional non-aqueous solvent which is miscible with water and as long as it cannot dissolve the vinylidene fluoride resin but can disperse, suspend, or emulsify the resin. The above-described non-aqueous solvent is used by mixing with water at any ratio. Water may be used alone or may be a mixed dispersion medium obtained by mixing water with one type or two or more types of non-aqueous solvents.

When the dispersion medium is used, the content of the dispersion medium contained in the coating composition is preferably from 60 to 3,500 parts by mass when the content of the vinylidene fluoride copolymer particle is 100 parts by mass.

The coating composition according to the present embodiment may further comprise a thickener. By including the thickener, the viscosity of the coating composition can be adjusted, and the dispersibility of the vinylidene fluoride resin and the filler described below can be improved.

Examples of the thickener include cellulose compounds such as carboxymethyl cellulose, methyl cellulose, hydroxypropyl cellulose, hydroxypropyl methylcellulose, and hydroxyethyl cellulose; ammonium salts or alkali metal salts of the above-mentioned cellulose compounds; polycarboxylic acids such as poly(meth)acrylic acid and modified poly(meth)acrylic acid; alkali metal salts of the above-mentioned polycarboxylic acids; polyvinyl alcohol-based (co)polymers such as polyvinyl alcohol, modified polyvinyl alcohol, and ethylene-vinyl alcohol copolymer; water-soluble polymers including saponified compounds of copolymers of unsaturated carboxylic acids, such as (meth)acrylic acid, maleic acid, and fumaric acid, and polyvinylpyrrolidone, polyvinyl butyral or vinyl ester. Among them, cellulose compounds and salts thereof are preferred. The thickener may be used alone or may be used as a combination of two or more types.

When the coating composition contains the thickener, the content of the thickener is preferably 10 parts by mass or less and more preferably 5 parts by mass or less when the content of the vinylidene fluoride copolymer particles in the coating composition is 100 parts by mass.

Also, if needed, the coating composition may contain a filler. The inclusion of filler can improve the heat resistance and ion permeability of the separator. Examples of the filler include oxides such as silicon dioxide ($SiO_2$), alumina ($Al_2O_3$), titanium dioxide ($TiO_2$), calcium oxide (CaO), strontium oxide (SrO), barium oxide (BaO), magnesium oxide (MgO), zinc oxide (ZnO), and barium titanate ($BaTiO_3$); hydroxides such as magnesium hydroxide ($Mg(OH)_2$), calcium hydroxide ($Ca(OH)_2$), zinc hydroxide ($Zn(OH)_2$), aluminum hydroxide ($Al(OH)_3$), and aluminum hydroxide oxide (AlO(OH)); carbonates such as calcium carbonate ($CaCO_3$); sulfates such as barium sulfate; nitrides; clay minerals; and boehmite. From the perspective of the safety of battery and the safety of coating, alumina, silicon dioxide, magnesium oxide, magnesium hydroxide, magnesium carbonate, zinc oxide, and boehmite are preferred. The filler may be used alone or may be used as a combination of two or more types.

When the coating composition contains the filler, the content of the filler is preferably from 10 to 900 parts by mass when the content of the vinylidene fluoride copolymer particle in the coating composition is 100 parts by mass.

Furthermore, the coating composition according to the present embodiment may further contain a surfactant, a pH adjusting agent, an anti-settling agent, a corrosion inhibitor, a dispersion stabilizer, an anti-fungal agent, a wetting agent, and/or an anti-foaming agent in addition to the components described above.

Fluororesin Layer

The vinylidene fluoride copolymer particles according to the present embodiment may be used in the fluororesin layer.

The fluororesin layer is formed by applying the coating composition according to the present embodiment to the separator or the electrode and then drying.

Although the film thickness of the fluororesin layer is not particularly limited, it is preferably 0.1 µm or more and 10 µm or less, more preferably 0.2 µm or more and 9.5 µm or less, and more preferably 0.3 µm or more and 9 µm or less.

The coating composition according to the present embodiment is applied such that the film thickness of the fluororesin layer is within the range described above.

Examples of the method for applying the coating composition include doctor blade method, reverse roll method, comma bar method, gravure method, air knife method, die coating method, and dip coating method.

The drying process of the coating film obtained by applying the coating composition is preferably performed at a temperature range of 40 to 150° C. and more preferably 45 to 130° C. for a processing time which is preferably for 1 to 500 minutes and more preferably for 2 to 300 minutes.

The fluororesin layer according to the present embodiment may be provided on at least one surface of the separator provided between the negative electrode layer and the positive electrode layer or may be provided in contact with the separator on at least one of the negative electrode layer and the positive electrode layer.

The fluororesin layer according to the present embodiment is provided between the separator and the electrode to allow providing sufficient adhesion between the separator and the electrode.

The peel strength between the separator and the electrode provided with the fluororesin layer according to the present embodiment is, for example, approximately 0.1 to 1.8 gf/mm. The method for measuring peel strength will be described in the examples described below.

Separator

The coating composition according to the present embodiment can be used, for example, in the separator. The separator according to the present embodiment is obtained by providing the fluororesin layer formed from the coating composition described above on at least one surface of the separator.

The separator according to the present embodiment is electrically stable and has no electrical conductivity. Further, the separator according to the present embodiment uses a porous substrate having pores or voids therein and has excellent ion permeability. Examples of the porous substrate include a single-layered or multi-layered porous film formed from polyolefin-based polymers (for example, polyethylene or polypropylene), polyester-based polymers (for example, polyethylene terephthalate), polyimide-based polymers (for example, aromatic polyamide polymers or polyetherimides), polyethersulfones, polysulfone, polyether ketone, polystyrene, polyethylene oxides, polycarbonates, polyvinyl chlorides, polyacrylonitriles, polymethyl methacrylates, ceramics, and mixtures of at least two types thereof; nonwovens; glass; and paper. Note that the modified polymer is also included in the above-described polymer.

The porous substrate is preferably polyolefin-based polymers (for example, polyethylene or polypropylene). From the perspective of the shutdown function, the inclusion of polyethylene is more preferred. From the perspective of the shutdown function and heat resistance, the inclusion of 95 mass % or more of polyethylene and 5 mass % or less of polypropylene is even more preferred.

The thickness of the porous substrate is preferably from 3 µm to 25 µm and more preferably from 5 µm to 25 µm, from the perspective of the mechanical properties and the internal resistance.

The surface of the porous substrate may be subjected to corona treatment, plasma treatment, flame treatment, or ultraviolet irradiation treatment in order to improve the wettability with the coating composition liquid. In the separator according to the present embodiment, the fluororesin layer according to the present embodiment may be provided on at least one surface of the surfaces opposite the negative electrode layer and the positive electrode layer.

Electrode for Secondary Batteries

The negative electrode layer and the positive electrode layer according to the present embodiment are not particularly limited. For example, a known negative electrode layer and positive electrode layer in a secondary battery such as a non-aqueous electrolyte secondary battery can be used.

In an example, the negative electrode layer and the positive electrode layer have a configuration in which a layer of the electrode mixture is provided on the current collector. The layer of the electrode mixture is formed on at least one surface of the current collector. The electrode mixture may contain, for example, an electrode active material and a binder composition. The binder composition includes the vinylidene fluoride copolymer particle according to the present embodiment and the dispersion medium described above.

The electrode active material is not particularly limited. For example, a known electrode active material for the negative electrode (negative electrode active material) or electrode active material for the positive electrode (positive electrode active material) can be used.

Examples of the negative electrode active material include carbon materials such as artificial graphites, natural graphites, non-graphitizable carbon, graphitizable carbon, activated carbon, phenol resins, and carbonized pitch by calcination; metal materials and alloy materials such as Cu, Li, Mg, B, Al, Ga, In, Si, Ge, Sn, Pb, Sb, Bi, Cd, Ag, Zn, Hf, Zr, and Y; and metal oxides such as GeO, $GeO_2$, SnO, $SnO_2$, PbO, and $PbO_2$.

A lithium-based positive electrode active material containing at least lithium is preferable as the positive electrode active material.

Examples of lithium-based positive electrode active material include composite metal chalcogenide compounds represented by the general formula $LiMY_2$ (where M is at least one of a transition metal such as Co, Ni, Fe, Mn, Cr, or V, and Y is a chalcogen element such as O or S) such as $LiCoO_2$ or $LiNi_xCo_{1-x}O_2$ ($0 \leq x \leq 1$); composite metal oxides having a spinel structure such as $LiMn_2O_4$, and olivine-type lithium compounds such as $LiFePO_4$.

Furthermore, examples of the binder composition include the composition containing, in addition to the composition containing the vinylidene fluoride copolymer particle according to the present embodiment, at least one of still another vinylidene fluoride polymer; polytetrafluoroethylene (PTFE); styrene-butadiene rubber (SBR); polyacrylic acid; polyimide; cellulose compounds such as carboxymethyl cellulose; ammonium salts and alkali metal salts of cellulose compounds; and polyacrylonitrile (PAN).

The electrode mixture may further include conductive aids such as carbon black, acetylene black, Ketjen black, graphite powder, carbon fiber, and carbon nanotube; pigment dispersants such as polyvinylpyrrolidone; and adhesion aids such as polyacrylic acid and polymethacrylic acid in addition to the components described above.

The current collector is a substrate of the negative electrode layer and the positive electrode layer and is a terminal for producing electricity. The material of the current collector is not particularly limited, and foil of metals such as aluminum, copper, iron, stainless steel, steel, nickel, and titanium, or metal steel can be used as the material of the current collector.

Although the thickness of the current collector is not particularly limited, it is preferably from 5 to 100 µm and more preferably from 5 to 70 µm.

Although the thickness of the layer of the electrode mixture is not particularly limited, it is preferably from 6 to 1,000 µm and more preferably from 7 to 500 µm.

In the electrode, the fluororesin layer may be provided in contact with the separator in at least one of the negative electrode layer and the positive electrode layer.

Electrolyte

The electrolyte used in the secondary battery according to the present embodiment is not particularly limited. For example, a known electrolyte in the secondary battery can be used. The Electrolyte include, for example, $LiPF_6$, $LiBF_4$, $LiClO_4$, $LiAsF_6$, $LiSbF_6$, $LiCF_3SO_3$, $Li(CF_3SO_2)_2N$, $LiC_4F_9SO_3$, $Li(CF_3SO_2)_3C$, and $LiBPh_4$. In the secondary battery according to the present embodiment, an electrolyte solution in which the electrolyte is dissolved in a non-aqueous solvent can be used. Examples of the non-aqueous solvent include cyclic carbonates such as ethylene carbonate, propylene carbonate, butylene carbonate, fluoroethylene carbonate, and difluoroethylene carbonate; linear carbonates such as dimethyl carbonate, diethyl carbonate, ethyl methyl carbonate, and fluorine substitutions thereof; cyclic esters such as γ-butyrolactone and γ-valerolactone; and mixed solvents thereof.

Secondary Battery

The secondary battery according to the present embodiment includes the separator according to the present embodiment. In the present embodiment, the secondary battery may have a configuration including the electrode provided with the above-described fluororesin layer.

The secondary battery according to the present embodiment can be classified, for example, by the type of electrolyte. Specific examples include non-aqueous electrolyte secondary batteries and solid electrolyte secondary batteries. Among them, non-aqueous electrolyte secondary batteries are preferred.

Examples of the non-aqueous electrolyte secondary batteries include a polymer batteries containing a gel electrolyte. Note that the other members of the non-aqueous electrolyte secondary batteries are not particularly limited, and for example, commonly used members can be used.

Example of the production method of the non-aqueous electrolyte secondary battery includes a method by overlaying the negative electrode layer and the positive electrode via the separator, placing into a battery container, injecting the electrolyte solution in the battery container, and sealing the inlet of the battery container. In this production method, at least a part of the vinylidene fluoride resin contained in the coating composition is melted and adhered to the separator by a heat press after the injection of the electrode liquid.

The temperature of the heat press is not particularly limited as long as the temperature is a temperature at which the separator does not melt. For example, the temperature can be set to be from 30 to 150° C. In addition, the pressure of the heat press is not particularly limited. For example, the pressure can be set to be from 1 to 30 MPa.

SUMMARY

As described above, the vinylidene fluoride copolymer particle of an embodiment of the present invention includes a constituent unit derived from vinylidene fluoride; and a constituent unit derived from a compound having an oxygen atom-containing functional group; wherein a ratio of oxygen atom in a surface of the vinylidene fluoride copolymer particle is higher than a ratio of oxygen atom in the vinylidene fluoride copolymer particle other than the surface thereof.

In the vinylidene fluoride copolymer particle according to an embodiment of the present invention, the ratio of oxygen atom is preferably 9 at % or more in all elements presented in the surface as determined by XPS measurement.

In the vinylidene fluoride copolymer particle according to an embodiment of the present invention, the oxygen atom-containing functional group is preferably a carboxyl group or a carboxylate.

In the vinylidene fluoride copolymer particle according to an embodiment of the present invention, the compound having the oxygen atom-containing functional group is preferably at least one type selected from the group consisting of an unsaturated dibasic acid, an unsaturated dibasic acid monoester, a compound represented by the following formula (2), a compound represented by the following formula (3), and a compound represented by the following formula (4).

[Chemical Formula 5]

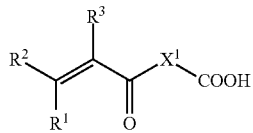

(2)

In the above formula (2), $R^1$, $R^2$, and $R^3$ are each independently a hydrogen atom, a chlorine atom, or an alkyl group having from 1 to 5 carbon atoms; and $X^1$ is an atomic group having a main chain constituted of 1 to 19 atoms, having a molecular weight of 472 or less, and containing at least one heteroatom selected from an oxygen atom and a nitrogen atom.

[Chemical Formula 6]

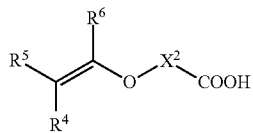

(3)

In the above formula (3), $R^4$, $R^5$, and $R^6$ are each independently a hydrogen atom, a chlorine atom, or an alkyl group having from 1 to 5 carbon atoms; and $X^2$ is an atomic group having a main chain constituted of 1 to 19 atoms, having a molecular weight of 484 or less, and containing at least one heteroatom selected from an oxygen atom and a nitrogen atom.

[Chemical Formula 7]

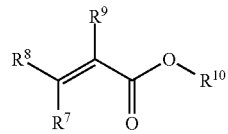

(4)

In the above formula (4), $R^7$, $R^8$, and $R^9$ are each independently a hydrogen atom, a chlorine atom, or an alkyl group having from 1 to 5 carbon atoms; and $R^{10}$ is a hydrogen atom or a hydrocarbon moiety having from 1 to 5 carbon atoms and containing at least one hydroxyl group.

In the vinylidene fluoride copolymer particle according to an embodiment of the present invention, the compound represented by the above formula (2) is preferably a compound represented by the following formula (5).

[Chemical Formula 8]

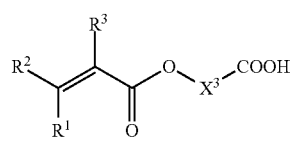

(5)

In the above formula (5), $R^1$, $R^2$, and $R^3$ are each independently a hydrogen atom, a chlorine atom, or an alkyl group having from 1 to 5 carbon atoms; and $X^3$ is an atomic group having a main chain constituted of 1 to 18 atoms and having a molecular weight of 456 or less.

Preferably, the vinylidene fluoride copolymer particle according to an embodiment of the present invention further contain a constituent unit derived from a fluorinated alkyl vinyl compound.

An embodiment of the present invention provides a dispersion including the vinylidene fluoride copolymer particle according to an embodiment of the present invention and a dispersion medium.

An embodiment of the present invention also provides a coating composition for forming a fluororesin layer provided on at least one surface of a separator provided between a negative electrode layer and a positive electrode layer in a secondary battery, including the vinylidene fluoride copolymer particle according to an embodiment of the present invention.

The coating composition according to an embodiment of the present invention may further include a thickener.

The coating composition according to an embodiment of the present invention may further include a filler.

An embodiment of the present invention also provides a separator, including a fluororesin layer formed from the coating composition according to one embodiment of the present invention, the fluororesin layer being provided on at least one surface of the separator.

An embodiment of the present invention also provides a secondary battery including the separator according to an embodiment of the present invention.

An embodiment of the present invention also provides a coating composition for forming a fluororesin layer provided on at least one surface of a negative electrode layer and a positive electrode layer so as to contact with a separator provided between the negative electrode layer and the positive electrode layer in a secondary battery, the coating composition including the vinylidene fluoride copolymer particle according to an embodiment of the present invention.

An embodiment of the present invention also provides a binder composition comprising the vinylidene fluoride copolymer particle according to an embodiment of the present invention.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents described in the present specification are herein incorporated by reference.

EXAMPLES

As described below, a separator was produced by using the vinylidene fluoride copolymer particle according to the present invention. The peel strength test was performed using the separator. Note that, prior to the description of the specific examples, a method for calculating the "solid content concentration" and "particle size" in the specification will be described below.

Solid Content Concentration

To an aluminum cup, about 5 g of a latex prepared by polymerization was added and dried at 80° C. for 3 hours. The concentration was calculated by measuring the weight before and after drying.

Particle Size

Particle size was calculated by the normalization analysis of dynamic light scattering. Specifically, the particle was measured by using "DelsaMaxCORE" available from BECKMAN COULTER Inc. according to JIS Z 8828. Two peaks, a large peak and a small peak, were obtained by the normalization analysis. Among two peaks, the large peak was considered as particle size.

Preparation of Vinylidene Fluoride Copolymer Particle

The method for preparing vinylidene fluoride copolymer particle in each Example and each Comparative Example will be described below.

Example 1

To an autoclave was added 330 parts by mass of ion-exchanged water as the dispersion medium and degassed by nitrogen bubbling for 30 min. Next, 1.0 parts by mass of ammonium perfluorooctanoate salt (PFOA) as a surfactant was added to the autoclave. The autoclave was pressured to 4.5 MPa and then nitrogen was purged, and the procedure was repeated three times. Next, 0.05 parts by mass of ethyl acetate as a chain transfer agent, 35 parts by mass of vinylidene fluoride (VDF), and 8.0 parts by mass of hexafluoropropylene (HFP) as another compound were added to the autoclave. Then, after heating to 80° C. under stirring, the reaction was initiated by adding 5 wt % of aqueous ammonium persulfate solution as a polymerization initiator in an amount corresponding to 0.1 parts by mass based on ammonium persulfate to the autoclave. After initiating the reaction, when the pressure was dropped to 2.5 MPa, 56.9 parts by mass of VDF was continuously added so that the pressure inside the autoclave was maintained to 2.5 MPa. After initiating the reaction, at the time of 50 mass % or more of the VDF being continuously added, 0.1 parts by mass of acrylic acid (AA) was added as the oxygen atom-containing compound. When the pressure was dropped to 1.5 MPa, the polymerization was considered to be completed. A latex (dispersion) containing the particle was obtained. The solid content concentration of the obtained latex was 21.1 wt %, and the particle size was 140 nm.

Example 2

The polymerization was carried out in a similar manner as in Example 1, except that monomethyl maleate (MMM) was used as the oxygen atom-containing compound to obtain a latex containing the particle. The solid content concentration of the obtained latex was 20.8 wt %, and the particle size was 150 nm.

Example 3

The polymerization was carried out in a similar manner as in Example 1, except that acryloyloxypropyl succinate (APS) was used as the oxygen atom-containing compound to obtain a latex containing the particle. The solid content concentration of the obtained latex was 21.0 wt %, and the particle size was 150 nm.

Example 4

To an autoclave was added 330 parts by mass of ion-exchanged water as the dispersion medium and degassed by nitrogen bubbling for 30 min. Next, 0.7 parts by mass of ammonium perfluorooctanoate salt (PFOA) as a surfactant was added to the autoclave. The autoclave was pressured to 4.5 MPa and then nitrogen was purged, and the procedure was repeated three times. Next, 0.05 parts by mass of ethyl acetate as a chain transfer agent and 35 parts by mass of vinylidene fluoride (VDF) were added to the autoclave. Then, after heating to 80° C. under stirring, the reaction was initiated by adding 5 wt % of aqueous ammonium persulfate solution as a polymerization initiator in an amount corresponding to 0.1 parts by mass based on ammonium persulfate to the autoclave. After initiating the reaction, when the pressure was dropped to 2.5 MPa, 64.9 parts by mass of VDF was continuously added so that the pressure inside the autoclave was maintained to 2.5 MPa. After initiating the reaction, at the time of 50 mass % or more of the VDF being continuously added, 0.1 parts by mass of APS was added as the oxygen atom-containing compound. When the pressure was dropped to 1.5 MPa, the polymerization was considered to be completed. A latex containing the particle was obtained. The solid content concentration of the obtained latex was 21.4 wt %, and the particle size was 170 nm.

Comparative Example 1

As the first polymerization step, a vinylidene fluoride copolymer was obtained in a similar manner as in Example 1.

Next, as the second polymerization step, to an autoclave was added 700 parts by mass of ion-exchanged water as the dispersion medium and degassed by nitrogen bubbling for 30 min. Next, 100 parts by mass of the polymer particle from the first polymerization step dispersed in water, and 0.5 parts by mass of PFOA as a surfactant were added to the autoclave. The autoclave was pressured to 4.5 MPa and then nitrogen was purged, and the procedure was repeated three times. Next, 0.05 parts by mass of ethyl acetate as a chain transfer agent, 92 parts by mass of VDF, and 8.0 parts by mass of HFP as another compound were added to the autoclave. Next, after heating to 80° C. under stirring, the reaction was initiated by adding 5 wt % of aqueous ammonium persulfate solution as a polymerization initiator in an amount corresponding to 0.1 parts by mass based on ammonium persulfate to the autoclave. After initiating the reaction, when the pressure was dropped to 1.5 MPa, the second polymerization step was considered to be completed. A latex containing the particle was obtained. The solid content concentration of the obtained latex was 10.9 wt %, and the particle size was 160 nm.

Comparative Example 2

As the first polymerization step, a vinylidene fluoride copolymer was obtained in a similar manner as in Example 2.

Next, as the second polymerization step, a latex containing the particle was obtained by polymerization in a similar manner as in Comparative Example 1. The solid content concentration of the obtained latex was 10.6 wt %, and the particle size was 170 nm.

Comparative Example 3

As the first polymerization step, a vinylidene fluoride copolymer was obtained in a similar manner as in Example 2.

Next, as the second polymerization step, a latex containing the particle was obtained by polymerization in a similar manner as in Comparative Example 1. The solid content concentration of the obtained latex was 10.8 wt %, and the particle size was 160 nm.

Comparative Example 4

As the first polymerization step, a vinylidene fluoride copolymer was obtained in a similar manner as in Example 2.

Next, as the second polymerization step, a latex containing the particle was obtained by polymerization in a similar manner as in Comparative Example 1, except that HFP was not used, and the amount of VDF was changed from 92 parts by mass to 100 parts by mass. The solid content concentration of the obtained latex was 10.5 wt %, and the particle size was 190 nm.

Measurement of Physical Properties of Vinylidene Fluoride Copolymer Particle

The method for measuring physical properties of vinylidene fluoride copolymer particle in each Example and each Comparative Example will be described below.

Introduced Amount of HFP

The introduced amount of HFP contained in the vinylidene fluoride copolymer particle in the latex prepared in the polymerization was measured by $^{19}$F-NMR (available from BRUKER). The polymer was pulverized by salt precipitation, and 40 mg of the pulverized polymer was dissolved in 960 mg of acetone-d6 to form a measurement sample. The peak of $CF_3$ derived from the HFP unit corresponds to two peaks near from −70 to 80 ppm. The peak of $CF_2$ derived from VDF and the HFP unit (all monomers) corresponds to the peak below −90 ppm. The introduced amount of HFP can be determined by using the intensities of these peaks, according to the following equation.

Introduced amount of HFP [mol %]=peak area of HFP/peak area of all monomers×100

Melting Point

The melting point of the vinylidene fluoride copolymer particle in the dispersion prepared by the polymerization was measured in the film form. The film was made by the following operations. A mold having a depth of 5 cm×width of 5 cm×thickness of 15 μm and about 1 g of the pulverized polymer by salt precipitation were sandwiched between the two aluminum foils sprayed with a release agent and pressed at 200° C. The melting point was measured by using DSC ("DSC-1" available from METTLER) according to ASTM d 3418.

Absorbance Ratio (IR Ratio) $A_R$

The dispersion of the particle obtained in each Example or each Comparative Example was salt precipitated with 0.5 mass % of calcium chloride and dried in an oven at 80° C. to produce a powdery particle. The pulverized vinylidene fluoride copolymer particle was heat pressed at 200° C. to produce a press sheet having a thickness of about 0.01 μm. The IR spectra of the produced press sheet was measured in a range of 1500 $cm^{-1}$ to 4000 $cm^{-1}$ by using an infrared spectrophotometer FT-730 (available from Horiba, Ltd.). The IR ratio $A_R$ was determined by the following equation.

$A_R = A_{1760}/A_{3020}$

In the above-described equation, $A_{1760}$ is an absorbance derived from the stretching vibration of the carbonyl group detected near 1760 $cm^{-1}$. The peak detected from 1600 $cm^{-1}$ to 1800 $cm^{-1}$ is considered to be the absorbance derived from the stretching vibration of the carbonyl group. $A_{3020}$ is an absorbance derived from the stretching vibration of CH detected near 3020 $cm^{-1}$. The peak detected from 2900 $cm^{-1}$ to 3100 $cm^{-1}$ is considered to be the absorbance derived from the stretching vibration of the carbonyl group.

XPS

The measurement sample was made by the following operations. After the latex obtained by the polymerization was washed with an ampholytic dialysis membrane, the latex was spread into a metal container, and moisture was removed by natural drying. Furthermore, vacuum drying was performed at normal temperature so that the state of the particle surface did not change, and the particles were milled by a mortar to obtain a particulate powder sample. This was fixed to the XPS measurement sample base using indium foil.

A PS9010MC available from Japan Electronics Co., Ltd. was used for the measurement of XPS. As a ray source, 30 W (10 kV×5 mA) of Al-kα ray was used. The electron was replenished with a neutralization gun of 4 W (2 kV×2 mA). The measurement was carried out at a photoelectron detection angle of 90 degrees. The binding energy for each element was measured in wide scan (path energy 10 eV, step size 0.1 eV). The peak derived from F1s orbital at a range of 676 to 696 eV, the peak derived from O1s orbital at a range of 522 to 542 eV, and the peak derived from C1s orbital at a range of 278 to 298 eV were confirmed. The elemental composition analysis of the surface of the sample was measured by a narrow scan (path energy 50 eV, step size 0.1 eV), and the scan number was 16 for F1s, 128 for O1s, and 64 for C1s. The ratio of oxygen atom was calculated by dividing the value, which is obtained by dividing the peak area of O1s orbital obtained at the narrow scan by the manufacturer-recommended sensitivity factor, by the total of the value, which is obtained by dividing the peak areas of is orbital of each element by the manufacturer-recommended sensitivity factor.

Peel Strength Test

The vinylidene fluoride copolymer particle obtained in each Example and each Comparative Example was used to produce a separator coated with the vinylidene fluoride copolymer particle, and peel strength test to electrodes (the negative electrode and the positive electrode) was performed. The production method of the separator and electrode coated with the vinylidene fluoride copolymer particle will be described below in detail.

Production of Coating Composition

A coating composition was obtained by adding into water 100 parts by mass of the vinylidene fluoride copolymer particle and 2 parts by mass of CMC (carboxymethyl cellulose) (Cellogen 4H, available from Daiichi Kogyo Seiyaku Co., Ltd.) to prepare a composition having a solid content concentration of 10 mass %.

Production of Separator Coated with Fluororesin Layer for Measuring Peel Strength The coating composition obtained as described above was coated on one surface of separator (Hypoa ND420, available from Asahi Kasei Co., Ltd.) that is corona treated by using a corona treatment machine (available from Kasuga Electronics.) with a wire bar in a wet coating amount of 24 μm (grit 12) and then dried at 70° C. for 30 minutes. Furthermore, heat treatment was performed at 70° C. for 2 hours.

Production of Positive Electrode for Measuring Peel Strength

A slurry was produced by adding N-methyl-2-pyrrolidone to 94 parts by weight of $LiNiCoMnO_2$ (available from MX6 Umicore), 3 parts by weight of a conductive aid (available from Super P TIMCAL), and 3 parts by weight of PVDF (polyvinylidene fluoride) (KF #7200, available from Kureha Corporation). The slurry was applied on an Al foil (the thickness is 15 μm). After drying, it was pressed, and heat treatment was performed at 120° C. for 3 hours to obtain a positive electrode with an electrode bulk density of 3.0 $g/cm^3$ and a basis weight of 103 $g/m^2$.

Production of Negative Electrode for Measuring Peel Strength

A slurry was produced by adding into water 95 parts by weight of BTR918 (modified natural graphite, available from BTR), 2 parts by weight of a conductive aid (available from Super P TIMCAL), 2 parts by weight of SBR (styrene-butadiene rubber) latex (BM-400 available from Zeon Corporation), and 1 part by weight of CMC (carboxymethyl cellulose) (Cellogen 4H, available from Dai-ichi Kogyo Seiyaku Co., Ltd.). The slurry was applied on a Cu foil (the thickness is 10 μm). After drying, it was pressed, and heat treatment was performed at 150° C. for 3 hours to obtain a negative electrode with an electrode bulk density of 1.6 $g/cm^3$ and a basis weight of 50 $g/m^2$.

Production of Sample for Measuring Peel Strength and Measurement of Peel Strength The positive electrode and the negative electrode obtained as described above were cut into 2.5×5.0 cm piece, the separator coated with the vinylidene fluoride copolymer particle were cut into 3.0×6.0 cm piece, and the pieces were jointed. The jointed piece was immersed in 120 μL of an electrolyte solution (ethylene carbonate (EC)/Ethyl methyl carbonate (EMC)=3/7, $LiPF_6$ 1.2 M, VC 1 wt %), and then vacuum-degassed and sealed in an Al laminate cell and allowed to sit overnight.

By heat pressing the Al laminate cell, a sample for measuring peel strength of the positive electrode and a sample for measuring peel strength of the negative electrode were obtained. In the sample for measuring peel strength of the positive electrode and the sample for measuring peel strength of the negative electrode, a vinylidene fluoride resin film was formed at the interface between the coating separator and the electrode (the positive electrode and the negative electrode) by heat pressing. The sample for measuring peel strength of the positive electrode was produced by pre-heating at 80° C. for 1 minute and then heat pressing for 2 minutes at a surface pressure of about 4 MPa. On the other hand, the sample for measuring peel strength of the negative electrode was produced by pre-heating at 100° C. for 1 minute and then heat pressing for 2 minutes at a surface pressure of about 4 MPa.

For the obtained sample for measuring peel strength of the positive electrode or sample for measuring peel strength of the negative electrode, the positive electrode or the negative electrode were each fixed. The peel strength was measured by using a tensile tester ("STA-1150 universal testing machine" available from ORIENTEC) at a head speed of 200 mm/min by 180° peel test.

Results

The results of particle sizes, IR ratios, melting points, and peel strengths of each Example and each Comparative Example are shown in Table 1 to 3, in addition to the charged composition ratios of the particle in each Example and each Comparative Example. In Table 1, the "inner layer" is the center portion of the particle formed by the first polymerization step described above. The "outer layer" is the layer formed by the second polymerization step, the layer surrounding the inner layer.

TABLE 1

| | Charged composition (mass %) | | | | | | | | | |
|---|---|---|---|---|---|---|---|---|---|---|
| | Inner layer | | | | | Outer Layer | | | | |
| | VDF | HFP | AA | MMM | APS | VDF | HFP | AA | MMM | APS |
| Example 1 | | | | | | 91.9 | 8 | 0.1 | | |
| Example 2 | | | | | | 91.9 | 8 | | 0.1 | |
| Example 3 | | | | | | 91.9 | 8 | | | 0.1 |
| Example 4 | | | | | | 99.9 | | | | 0.1 |
| Comparative Example 1 | 91.9 | 8 | 0.1 | | | 92 | 8 | | | |
| Comparative Example 2 | 91.9 | 8 | | 0.1 | | 92 | 8 | | | |
| Comparative Example 3 | 91.9 | 8 | | | 0.1 | 92 | 8 | | | |
| Comparative Example 4 | 99.9 | | | | 0.1 | 100 | | | | |

TABLE 2

| | Particle size (nm) | Introduced amount of HFP (mol %) | IR Ratio | Melting point (° C.) |
|---|---|---|---|---|
| Example 1 | 140 | 2.5 | 0.11 | 143 |
| Example 2 | 150 | 2.9 | 0.11 | 143 |
| Example 3 | 150 | 2.4 | 0.14 | 143 |
| Example 4 | 170 | — | 0.13 | 162 |
| Comparative Example 1 | 160 | 2.0 | 0.10 | 150 |
| Comparative Example 2 | 170 | 2.1 | 0.10 | 150 |
| Comparative Example 3 | 160 | 2.2 | 0.11 | 150 |
| Comparative Example 4 | 190 | — | 0.12 | 164 |

TABLE 3

| | Peel strength | | Oxygen atom concentration (at %) |
|---|---|---|---|
| | Positive electrode (gf/mm) | Negative electrode (gf/mm) | |
| Example 1 | 1.63 | 1.29 | 10.2 |
| Example 2 | 1.78 | 0.75 | 10.6 |
| Example 3 | 1.81 | 1.48 | 12.3 |
| Example 4 | 0.071 | — | 9.3 |
| Comparative Example 1 | 0.76 | 0.14 | 5.3 |
| Comparative Example 2 | 1.19 | 0.14 | 7.0 |
| Comparative Example 3 | 0.95 | 0.09 | 7.9 |
| Comparative Example 4 | 0.069 | — | 2.9 |

INDUSTRIAL APPLICABILITY

The vinylidene fluoride copolymer particles of the present invention can be suitably used in the production of secondary batteries, for example.

The invention claimed is:

1. A copolymer particle comprising vinylidene fluoride copolymer having a constituent unit derived from vinylidene fluoride, and a constituent unit derived from a compound having an oxygen atom-containing functional group, wherein the vinylidene fluoride copolymer particle has a surface and a core which each contain vinylidene fluoride copolymer, and
a ratio of oxygen atom of the vinylidene fluoride copolymer in the surface of the vinylidene fluoride copolymer particle is higher than a ratio of oxygen atom of the vinylidene fluoride copolymer in the core of the vinylidene fluoride copolymer particle.

2. The vinylidene fluoride copolymer particle according to claim 1, wherein the ratio of oxygen atom is 9 at % or more in all elements presented in the surface as determined by XPS (X-ray photoelectron spectroscopy) measurement.

3. The vinylidene fluoride copolymer particle according to claim 1, wherein the oxygen atom-containing functional group is a carboxyl group or a carboxylate.

4. The vinylidene fluoride copolymer particle according to claim 1, wherein the compound having an oxygen atom-containing functional group is at least one type selected from the group consisting of an unsaturated dibasic acid, an unsaturated dibasic acid monoester, a compound represented by the formula (2), a compound represented by the formula (3), and a compound represented by the formula (4):

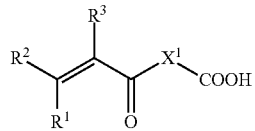
(2)

in the formula (2), $R^1$, $R^2$, and $R^3$ are each independently a hydrogen atom, a chlorine atom, or an alkyl group having from 1 to 5 carbon atoms; and $X^1$ is an atomic group having a main chain constituted of 1 to 19 atoms, having a molecular weight of 472 or less, and containing at least one heteroatom selected from an oxygen atom and a nitrogen atom;

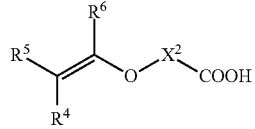
(3)

in the formula (3), $R^4$, $R^5$, and $R^6$ are each independently a hydrogen atom, a chlorine atom, or an alkyl group having from 1 to 5 carbon atoms; and $X^2$ is an atomic group having a main chain constituted of 1 to 19 atoms, having a molecular weight of 484 or less, and containing at least one heteroatom selected from an oxygen atom and a nitrogen atom; and

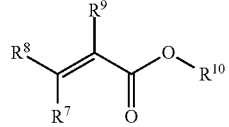
(4)

in the formula (4), $R^7$, $R^8$, and $R^9$ are each independently a hydrogen atom, a chlorine atom, or an alkyl group having from 1 to 5 carbon atoms; and $R^{10}$ is a hydrogen atom or a hydrocarbon moiety having from 1 to 5 carbon atoms and containing at least one hydroxyl group.

5. The vinylidene fluoride copolymer particle according to claim 4, wherein the compound represented by the formula (2) is a compound represented by the formula (5):

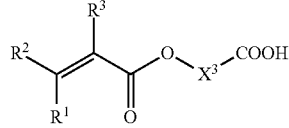
(5)

in the formula (5), $R^1$, $R^2$, and $R^3$ are each independently a hydrogen atom, a chlorine atom, or an alkyl group having from 1 to 5 carbon atoms; and $X^3$ is an atomic group having a main chain constituted of 1 to 18 atoms and having a molecular weight of 456 or less.

6. The vinylidene fluoride copolymer particle according to claim 1, further comprising a constituent unit derived from a fluorinated alkyl vinyl compound.

7. A dispersion comprising the vinylidene fluoride copolymer particle described in claim 1 and a dispersion medium.

8. A coating composition for forming a fluororesin layer provided on at least one surface of a separator provided between a negative electrode layer and a positive electrode layer in a secondary battery, the coating composition comprising the vinylidene fluoride copolymer particle described in claim 1.

9. The coating composition according to claim 8, further comprising a thickener.

10. The coating composition according to claim 8, further comprising a filler.

11. A separator, comprising a fluororesin layer formed from the coating composition described in claim 8, the fluororesin layer being provided on at least one surface of the separator.

12. A secondary battery comprising the separator described in claim 11.

13. A coating composition for forming a fluororesin layer provided on at least one surface of a negative electrode layer and a positive electrode layer so as to contact with a separator provided between the negative electrode layer and the positive electrode layer in a secondary battery, the coating composition comprising the vinylidene fluoride copolymer particle described in claim 1.

14. A binder composition comprising the vinylidene fluoride copolymer particle described in claim 1.

\* \* \* \* \*